(12) United States Patent
Mauldin

(10) Patent No.: US 8,558,098 B1
(45) Date of Patent: Oct. 15, 2013

(54) RECONFIGURABLE MAGNETIC NUMERICAL KEYBOARD CHARTS AND NUMERICALLY NOTATED SHEETS FOR TEACHING STUDENTS TO PLAY PIANO

(76) Inventor: Larisa Mauldin, Jacksonville, FL (US)

( * ) Notice: Subject to any disclaimer, the term of this patent is extended or adjusted under 35 U.S.C. 154(b) by 5 days.

(21) Appl. No.: 13/441,885

(22) Filed: Apr. 8, 2012

Related U.S. Application Data

(60) Provisional application No. 61/473,186, filed on Apr. 8, 2011.

(51) Int. Cl.
*G09B 15/08* (2006.01)

(52) U.S. Cl.
USPC ............................................. 84/478

(58) Field of Classification Search
USPC ...... 84/470 R, 471 R, 472–475, 471 SR, 476, 84/477 R, 478, 479 R, 483.1, 483.2, 484, 84/485 R, 485 SR
See application file for complete search history.

(56) References Cited

U.S. PATENT DOCUMENTS 2,977,836 A * 4/1961 Lang .......................... 84/471 R
6,093,879 A * 7/2000 Pye ............................... 84/451

* cited by examiner

*Primary Examiner* — Kimberly Lockett
(74) *Attorney, Agent, or Firm* — Mark Young, P.A.

(57) ABSTRACT

A reconfigurable magnetic numerical keyboard chart and a numerically notated sheet facilitates learning to play and playing piano. The chart fits behind a keyboard. Notes are numbered. The numbers correspond to keys to be played. A notated sheet shows the sequence of keys to play, including a duration for each key. Complex musical notation can be avoided. Indicia displayed on the magnetic chart may be changed using magnetic pieces.

20 Claims, 8 Drawing Sheets

FIGURE 8

NOTATED

| I | CAN | AL——MOST | SEE | IT |
|---|---|---|---|---|
| 3 | 3 | 3      5 | +1 | 5 |

| THAT | DREAM | I'M | DREAM——IN | BUT |
|---|---|---|---|---|
| 3 | 3 | 5 | +2    +1 | #6 |

| THERE'S | A | VOICE | IN——SIDE | MY | HEAD | SAY——ING |
|---|---|---|---|---|---|---|
| 6 | 6 | 6 | 5     5 | 4 | 4 | ♭2    1 |

| YOU'LL | NEV——ER | REACH | IT |
|---|---|---|---|
| +1 | +1    5 | 6 | 5 |

RECONFIGURABLE MAGNETIC NUMERICAL KEYBOARD CHARTS AND NUMERICALLY NOTATED SHEETS FOR TEACHING STUDENTS TO PLAY PIANO

RELATED APPLICATION

This application is a nonprovisional of and claims the benefit of priority of U.S. Provisional Application No. 61473186, filed Apr. 8, 2011, the entire contents of which is incorporated herein.

FIELD OF THE INVENTION

This invention relates generally to teaching students to play piano, and, more particularly, to numerical keyboard charts and numerically notated sheets for teaching students to play piano.

BACKGROUND

Learning to play the piano is a difficult yet rewarding task. One of the most difficult hurdles in learning how to play the piano is comprehending musical notation and relating the notes on a page of music to the keys on the piano.

To the uninitiated, a piano keyboard is daunting. The keyboard comprises a set of adjacent depressible keys, including larger, longer keys and smaller, shorter keys that repeat at the interval of an octave. Almost every modern piano has 36 black keys and 52 white keys for a total of 88 keys (seven octaves plus a minor third, from $A_0$ to $C_8$). The lowest pitch, A0, is on the left, and the highest pitch, C8, is on the far right. Within each octave, twelve notes of a musical scale are laid out with the lowest note on the left; the longer white keys (for the seven "natural" notes of the C major scale: C, D, E, F, G, A, B) jut forward. The black keys for the remaining five notes which are not part of the C major scale (namely C♯/D♭, D♯/E♭, F♯/G♭, G♯/A♭, A♯/B♭) are raised and set back.

To play a song on a piano, a student must be able to comprehend sheet music. A problem students have with reading music is that the symbols on the page represent a significant quantity and quality of information. The pitches of music are indicated with symbols, called notes, placed on a staff—five parallel lines on which each line and space represent a pitch. Notes can be natural, sharp or flat. The higher a note's placement on the staff, the higher the pitch. Seven of the twelve pitches of an octave are named after the first seven letters of the alphabet: A, B, C, D, E, F, G. The remaining five tones are indicated by the use of two signs, the sharp sign (♯) and the flat sign (♭). A clef is placed at the beginning of the staff to show the pitch of each line and space and represent which hand is used. Music is written in different keys—each associated with the presence of a central note, scale, and chord—which are indicated by a key signature. Rhythms are indicated with notes indicating time values relative to each other. The shape of the note head, the presence or absence of a stem, and the presence or absence of flags/beams/hooks may all determine the duration. Any of various rest symbols indicates a silence of a determined duration. Each element on the page adds a layer of complexity to the music. With so much information being presented, written music can seem like a jumble of dots and lines without meaning. It comes as no surprise that novice musicians may feel daunted when confronting even basic music scores.

For many novices, the notation on sheet music is cryptic and overwhelming. Students frequently abandon a musical curriculum not because they are poor musicians, but because they have difficulty making sense of music notation. Even if beginners have been instructed on what the notes and staffs symbolize, they have difficulty deciphering meaning from the notation and struggle to apply the notes to the keyboard. Yet, heretofore, learning how to read has been essential to progressing on the piano with its range of seven octaves and 88 keys.

Prior attempts to address these difficulties have involved creating keyboard charts and correspondingly notated sheet music. By way of example, U.S. Pat. No. 6,881,887 to Berens describes a guide with vertical numerically color coded lines. The guide is propped along the space between the keys and the fallboard of the piano. Sheet music is prepared with numbers and colors juxtaposed to the notes corresponding to the lines, so that the piano student will know which keys to stroke. Unfortunately, the mixing of numbers and colors to identify a key presents unique recognition and comprehension difficulties. Additionally, no indications are provided for duration. Furthermore, no means is provided to annotate or modify the charts.

The invention is directed to overcoming one or more of the problems and solving one or more of the needs as set forth above.

SUMMARY OF THE INVENTION

To solve one or more of the problems set forth above, in an exemplary implementation of the invention, a reconfigurable magnetic numerical keyboard chart and a numerically notated sheet facilitate learning to play and playing piano. The chart fits behind a keyboard. Notes are numbered. The numbers correspond to keys to be played. A notated sheet shows the sequence of keys to play, including a duration for each key. Complex musical notation can be avoided. Indicia displayed on the magnetic chart may be changed using magnetic pieces.

A music training kit includes a numerical keyboard chart and a numerically notated sheet. The numerical keyboard chart includes a sheet having a face and magnetic backing, a sheet width and a sheet height. The face of the keyboard chart displaying a plurality of rectangles corresponding to a plurality of keys on a keyboard. The keys on the keyboard include naturals and accidentals. The sheet width is no greater than a width of the keyboard. Each rectangle has a rectangle width about equal to a width of a key of the keyboard. Each rectangle is separated from an adjacent rectangle by a space. The plurality of rectangles is configured to align with the keys of the keyboard. The sheet height is between 1 inch and 6 inches. The rectangles corresponding to naturals have a first appearance, and the rectangles corresponding to accidentals have a second appearance (e.g., a different color or hatched). Each rectangle corresponding to a natural displays a number. The number is an integer having an absolute value from 1 to 7. Rectangles corresponding to a lower octave display a negative sign adjacent to the number displayed on the rectangles. Rectangles corresponding to a higher octave display a positive sign adjacent to the number displayed on the rectangles. Rectangles corresponding to a middle octave do not display a sign adjacent to the number displayed on the rectangles.

At least one magnetically attachable indicia is removably attachable to the face of the numerical keyboard chart. The magnetically attachable indicia may include a tile with a face and a backing, wherein the face of the tile is black and the backing is magnetic, and the attachable indicia is sized and shaped to cover one or more rectangles of the numerical keyboard chart. Alternatively, the face of the tile is shaped as (or displaying) an indicia from the group consisting of an integer number from 1 to 7, a plus sign, a minus sign, and a rectangle concealing tile. The integers, positive signs and negative signs may be raised and sensible by touch, and may include a Braille equivalent for each integer that is sensible by touch.

A corresponding numerically notated sheet includes a sheet having a plurality of rows. Each row displays a plurality of numbers. Each of the numbers is an integer having an absolute value from 1 to 7 and corresponds to a numbered rectangle of the numerical keyboard chart. The corresponding numerically notated sheet further includes a duration symbol beneath each number displayed on each row. Each duration symbol includes a horizontal line having a length corresponding to the duration of a key. Each horizontal line may include at least one tick, each tick indicating a unit of duration of a key. For example, each tick may correspond to a beat or quarter note or some other unit of duration. Each horizontal line, tick and number on the corresponding numerically notated sheet may be raised and sensible by touch. Further, a touch-sensible Braille equivalent for each number may be displayed on the corresponding numerically notated sheet.

A music training method includes a step of providing a numerically notated sheet, such as the numerically notated sheet described above. The method also includes a step of providing a numerical keyboard chart, such as the numerical keyboard chart described above. A magnetically attachable indicia as described above may be placed over each rectangle corresponding to a key not to be played.

A music training method according to the invention, may further include placing a magnetically attachable indicia over each rectangle corresponding to a key not to be played, each magnetically attachable indicia includes a tile with a face and a backing, the backing is magnetic. The method further entails playing a key for a duration according to the duration symbol.

BRIEF DESCRIPTION OF THE DRAWINGS

The foregoing and other aspects, objects, features and advantages of the invention will become better understood with reference to the following description, appended claims, and accompanying drawings, where:

FIG. 8 is exemplary conventional sheet music; and FIG. 9 is a numerically notated sheet for use with a reconfigurable magnetic numerical keyboard chart according to principles of the invention.

Those skilled in the art will appreciate that the figures are not intended to be drawn to any particular scale; nor are the figures intended to illustrate every embodiment of the invention. The invention is not limited to the exemplary embodiments depicted in the figures or the types of notes, chord, progressions, configuration, shapes, relative sizes, ornamental aspects or proportions shown in the figures.

DETAILED DESCRIPTION

Figure 1:
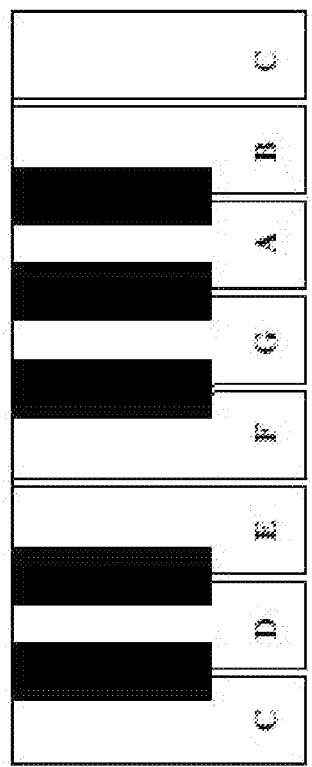
FIG. 1 illustrates piano keys corresponding to an octave.

The musical alphabet uses the letters A through G. The seven letters are repeated consecutively as notes rise in pitch. Each repetition is called an Octave. An octave is shown in FIG. 1. Within the octave, notes of a musical scale are laid out with the lowest note on the left; the longer white keys (for the seven "natural" notes of the C major scale: C, D, E, F, G, A, B and then repeating, starting, with C) jut forward. The black keys for the remaining five notes which are not part of the C major scale (namely C♯/D♭, D♯/E♭, F♯/G♭, G♯/A♭, A♯/B♭) are raised and set back. The ivories are the white keys of the piano, also called naturals. The ebonies are the black keys of a piano keyboard, also called variously sharps or accidentals.

Figure 2:
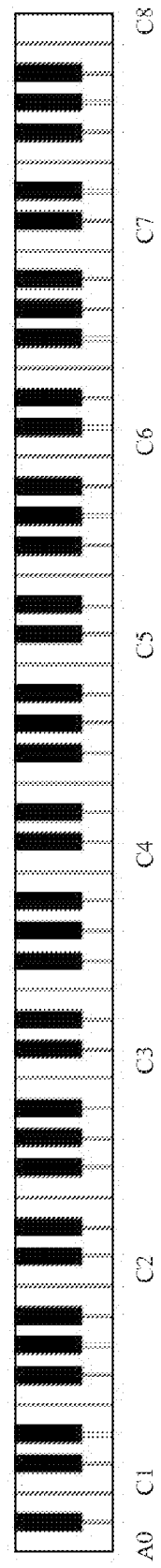
FIG. 2 illustrates an exemplary piano keyboard.

Referring now to FIG. 2, an exemplary piano keyboard is shown. It comprises a set of adjacent depressible keys, including larger, longer keys and smaller, shorter keys that repeat at the interval of an octave. Almost every modern piano has 36 black keys and 52 white keys for a total of 88 keys (seven octaves plus a minor third, from $A_0$ to $C_8$). The lowest pitch, A0, is on the left, and the highest pitch, C8, is on the far right.

The use of the invention in lieu of conventional music notation is a map to guide the eye through information on a musical score. Instead of having to interpret the seemingly cryptic information on a sheet, the eye quickly identifies a familiar and intuitive number, sign and duration on the sheet music. This information can quickly be related with corresponding numbers and signs on a keyboard chart, making it easier to navigate the score. Without learning musical notation, students build mental associations as reference points for playing.

Figure 3:
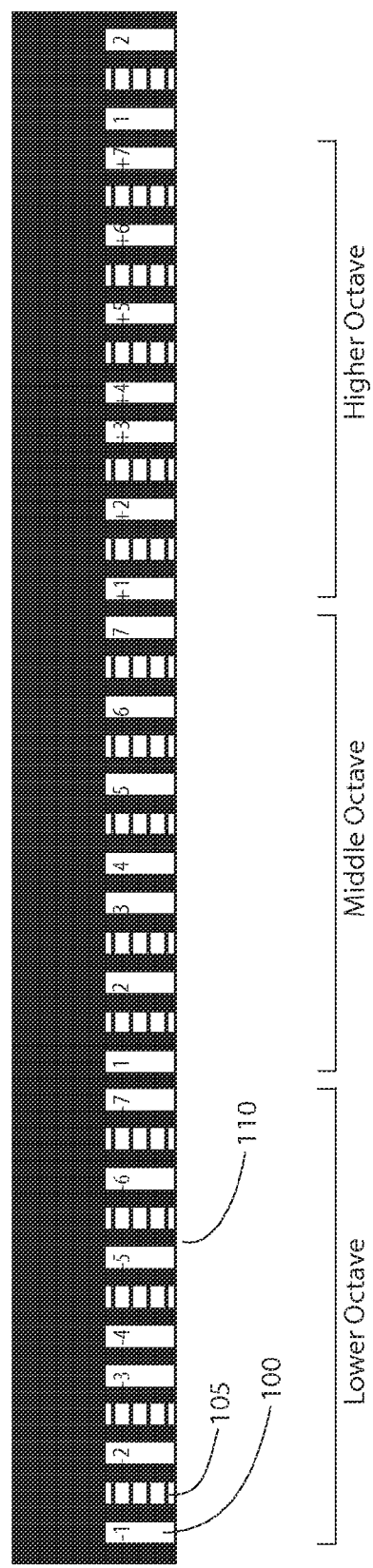
FIG. 3 is a plan view of a first exemplary reconfigurable magnetic numerical keyboard chart according to principles of the invention.
Figure 7:
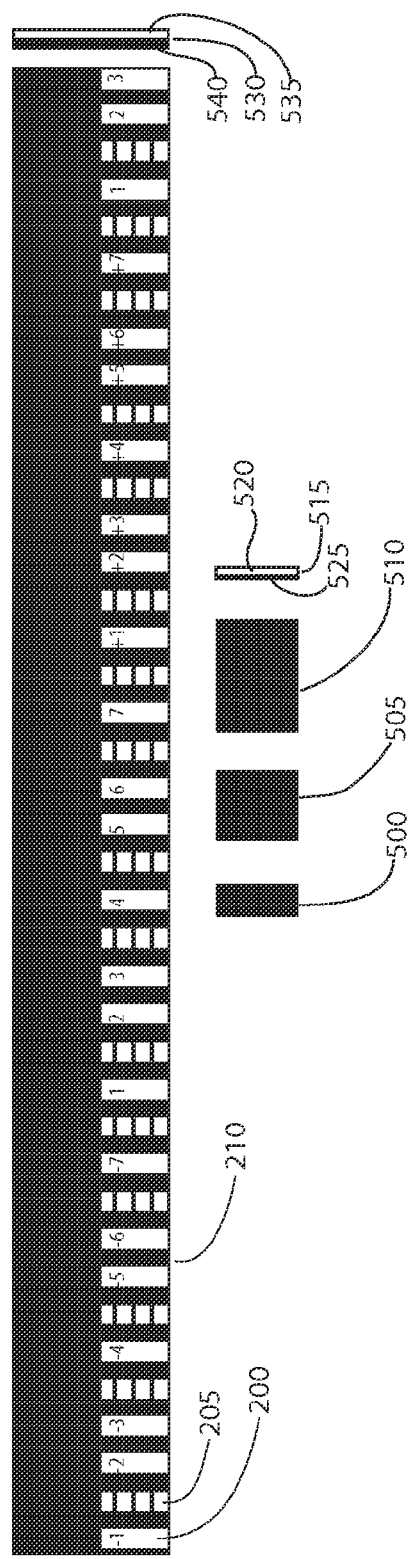
FIG. 7 provides plan and profile views of the first exemplary reconfigurable magnetic numerical keyboard chart along with attachable tiles according to principles of the invention.

Referring now to FIG. 3, an exemplary chart according to principles of the invention is shown. The chart is comprised of a durable relatively thin strip of generally rectangular-shaped material, having a total thickness of about 1 mm or less. A thickness of 1 mm is thin enough to fit in the available space behind keys of a piano without impeding movement of the keys. The length of the chart is less than the length of the piano keyboard. A height of at least one inch, preferably two to three inches, is preferred for stability and visibility. The material 530 is comprised of a flexible vinyl face 535 with a magnetic backing 540, such as magnetic sheet material used for sign making, as conceptually illustrated in the section view of FIG. 7. The magnetic backing 540 allows magnetically adhering indicia to the face of the chart. The indicia may include numbers, letters, symbols, instructions, notes, key tiles, concealing (e.g., black) tiles, and combinations of the foregoing. Exemplary concealing tiles 500, 505 and 510 are shown in FIG. 7. The exemplary concealing tiles may be placed over keys on the chart to conceal those keys. The magnetic chart allows customization and modification to enhance versatility. Thus, a key, notes, numbers, letters and symbols may be added, covered or removed. Each of these attachable items are referred to as an "attachable indicia." As shown in the exemplary section 515, each attachable items has a face 520 and a magnetic backing 525. The magnetic backing 525 of the attachable item, when placed against the face 535 of the chart, will adhere the attachable item to the chart by virtue of magnetic attraction between the magnetic backings 525, 540, even with the face 530 disposed between the magnetic backings 525, 540.

In an alternative embodiment, the attachable indicia may be attachable by static cling. In such case, the attachable indicia may be comprised of a vinyl or similar material with a high propensity for static cling.

In yet another alternative embodiment, the attachable indicia may be attachable by reusable adhesive. In such embodiment, the attachable indicia may include a reusable protective backing that may be removed to expose the adhesive surface.

As shown in FIG. 3, the chart 110 spans three octaves, a lower octave, a middle octave and a higher octave, which is enough to play many songs. By way of example and not limitation, the white key assigned number 1 on the chart, may be aligned behind the keyboard even with middle C (i.e., C4 in FIG. 2). In such case, the white key 100 marked −1 on the keyboard will align with C3 in FIG. 2. The striped keys 105 on the chart 110 will then align with black keys on the keyboard. Thus, the keys on the chart are configured (i.e., have a width and spacing) to align precisely with keys on the keyboard. The striped keys may be a solid color (e.g., red) to easily distinguish them from the white keys. However, stripes are used here to illustrate the distinction in black and white. Arabic numbers may be used for finger placement. For left handed applications, Roman numerals may be used. Letters may be added for key names.

Octave signs are used to distinguish the octaves. Keys in the lower octave are assigned a negative sign. Keys in the higher octave are assigned a positive sign. Keys in the middle octave omit a positive or negative sign. Other indicia, such as letters (e.g., L for lower and H for higher), may be used to distinguish the octaves.

Figure 4:
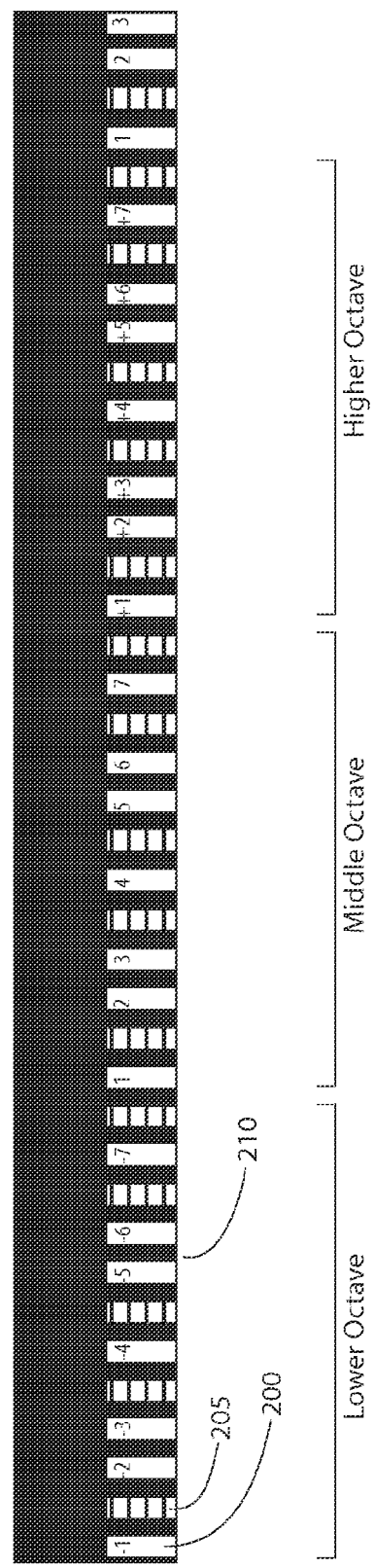
FIG. 4 is a plan view of a second exemplary reconfigurable magnetic numerical keyboard chart according to principles of the invention.
Figure 5:
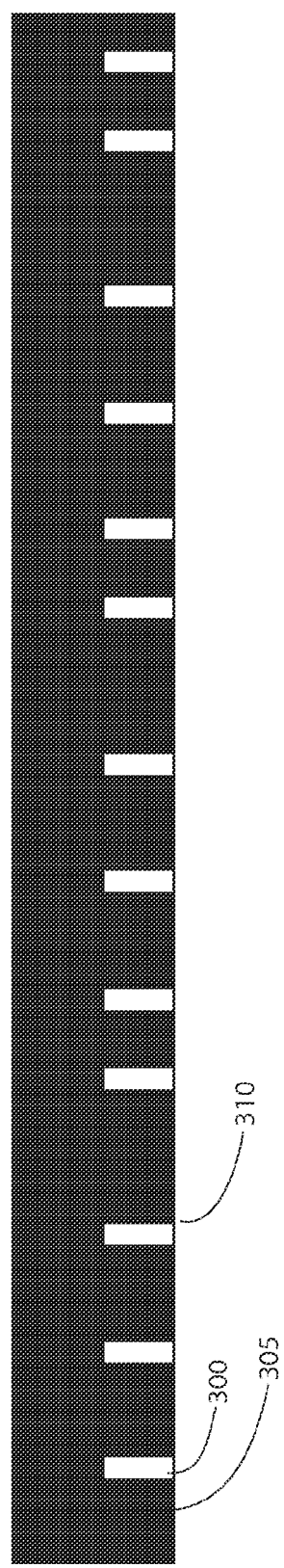
FIG. 5 is a plan view of a third exemplary reconfigurable magnetic numerical keyboard chart according to principles of the invention.
Figure 6:
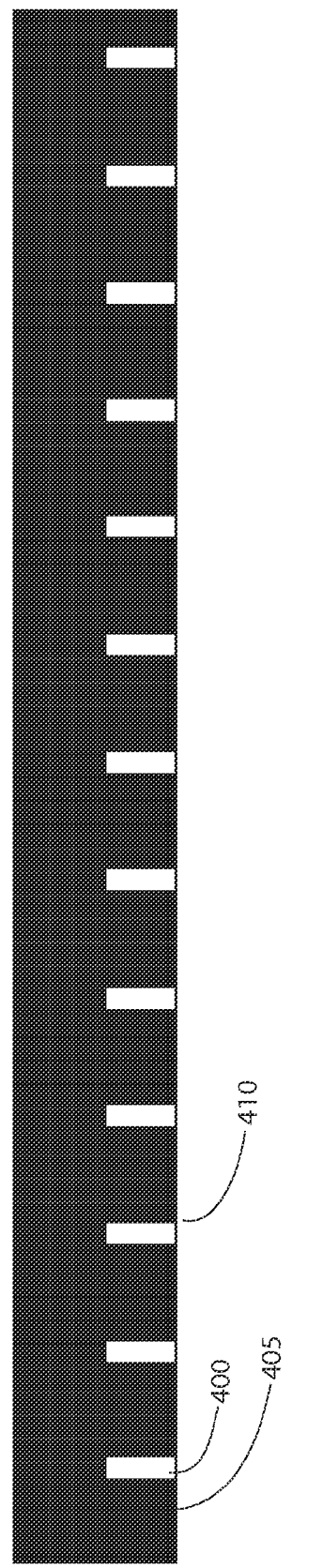
FIG. 6 is a plan view of a fourth exemplary reconfigurable magnetic numerical keyboard chart according to principles of the invention.

Using the principles of the invention, various chord charts can be constructed to cover various intervals and scales. For example, charts can be created for Major (M), Minor (m), Perfect (P), Augmented (A), and Diminished (d) intervals. FIG. 3 illustrates 3 chords of a Major (M) Chord Chart 110. FIG. 4 illustrates a Natural Minor Chord Chart 210 with white 200 and striped keys. FIG. 5 illustrates a Diminished 7° chord chart 310. FIG. 6 illustrates a Half Diminished 7° 410. In each case, white keys 100, 200, 300 and 400 are aligned with corresponding keys on the piano keyboard. Upon proper alignment, all of the remaining keys on the chart will align with the corresponding keys to be played on the piano keyboard. The black spaces 305, 405 in the Diminished 7° chord chart and in the Half Diminished 7° 410 corresponds with keys not to be played and spaces between keys. Thus, a chart may be configured to identify only those keys to be played.

In one embodiment, the black spaces may be black tiles that are adhered (e.g., adhesively, magnetically or via static cling) to the chart to cover otherwise visible keys. Multiple black tiles (i.e., concealing tiles) may be used to block out a series of keys. Each tile may be a thin sheet of material sized and shaped to overlay a key on the chart. The invention is not limited to an particular tile or key colors.

As another example, charts can be constructed in accordance with the principles of the invention, to play particular songs or types of music, including chords and progressions. Illustratively, to play jazz, it is important to know the types of jazz piano chords used in the music. One common Jazz chord is the sixth. On a chord chart, this can be represented as C6 or Cadd6. The C6 chord is formed by simultaneously playing the notes C-E-G-A, the A being the sixth. A Cadd6 replaces the fifth with the sixth, or C-E-A. Another very popular chord in jazz music is the seventh. In musical notation, a seventh in the key of C appears as C7. The notes of this chord are C-E-G-B flat. Equally popular is the major seventh, notated Cmaj7 in the case of the C chord. A Cmaj7 is played using the notes C-E-G-B. The major seventh may look similar to the seventh chord, but as you will hear when you play them, they are distinctly different. These are merely examples of the special types of charts than can be created using white keys, colored keys to represent black keys on a keyboard, optionally numbers with and/or without a + or − sign, an black spaces, in accordance with the principles of the invention.

An important aspect of the invention is properly notated sheet music. FIG. 8 provides an example of conventional sheet music. The pitches of music are indicated with symbols, called notes, placed on a staff—five parallel lines on which each line and space represent a pitch. Notes can be natural, sharp or flat. The higher a note's placement on the staff, the higher the pitch. A clef is placed at the beginning of the staff to show the pitch of each line and space and represent which hand is used. The shape of the note head, the presence or absence of a stem, and the presence or absence of flags/beams/hooks may all determine the duration. Any of various rest symbols indicates a silence of a determined duration. Each element on the page adds a layer of complexity to the music. With so much information being presented, the sheet music can easily seem like a jumble of dots and lines without meaning.

In sharp contrast, sheet music notated according to principles of the invention is much easier to comprehend and apply. Referring to FIG. 9, the song is notated for use with the chart shown in FIG. 3. The five parallel lines used for the conventional notation are not used and can be deleted. Lyrics are provided between a pair of parallel lines. Below the lyrics are numbers that correspond to the keys to be played. Keys in the lower and higher octaves have − and + signs, respectively. Below each key number is a duration symbol comprising a horizontal line, the length of which indicates the duration. Optionally, tick marks may be provided to more clearly illustrate the length of the horizontal line. By way of illustration, tick marks are shown on the horizontal lines beneath the numbers 5 and +1, beneath the words MOST and SEE in the first (top) row of FIG. 9. It is understood that tick marks may be used with all such horizontal lines. Sharp and flat symbols are provided with corresponding notes.

Thus, according to principles of the invention, a notation sheet may be constructed by converting conventional sheet music to the form and format described herein. The conversion, which may be automatic (e.g., using optical character recognition) or manual, entails replacing key symbols with key numbers, which correspond to the numbers assigned to keys on the chart. Octave indicators are replaced with a + or − sign. Duration for which each note is played is shown by a horizontal line, which may include tick marks, instead of the time signature measure and bar line in conventional sheet music. Each tick or the smallest unit of the horizontal line may, by way of example, correspond to a quarter note. Sharp and flat symbols are provided with each note requiring the same.

In a computer-assisted implementation, a program divides area of a sheet into rows and columns. The columns may not have any border lines. The rows are populated with notes to be played. One note may be indicated in each column. Key symbols in conventional notation are replaced with key numbers, which correspond to the numbers assigned to keys on the chart. Octave indicators are replaced with a + or − sign. Duration for which each note is played is shown by a horizontal line, which may include tick marks, instead of the time signature measure and bar line in conventional sheet music. Each tick or the smallest unit of the horizontal line may, by way of example, correspond to a quarter note. Sharp and flat symbols are provided with each note requiring the same. Thus, each note to be played will be shown in a column of a row. Each key will be designated by a number. A + or – octave indicator will be displayed where appropriate. Duration will be indicated with a horizontal line, which may include tick marks. Sharp and flat symbols are displayed where appropriate.

As can be readily seen with reference to the examples provided in FIG. 3 and FIG. 9, the invention makes interpreting music easier, accelerating the pace of learning to play the piano. It allows piano students to pass the major hurdle of comprehending notation to playing from written music. For example, for the first note, any student, even an uninitiated beginner, can identify the key on the keyboard corresponding to key number 3 on the chart in FIG. 3 and determine that a short duration applies, as shown in FIG. 9. The invention thus reduces the risk of new music students getting frustrated and quitting the piano before learning how to play beautiful music.

Nearly all songs and musical scores are based on melodic movements that are composed of patterns of repeating notes. Using the invention, a music student can quickly and clearly see patterns and how they contrast against other notes on a sheet. This reduces the time novices need to learn to interpret and play music on a piano, and to become proficient. In turn, this reduces boredom, monotony and frustration, as well as the attendant risk of dropping out of a musical curriculum. Concomitantly, it improved self-esteem and level of enjoyment.

A system and method according to principles of the invention may also facilitate training visually impaired individuals. All of the indicia and symbols may be represented in a tactile form, including Braille. For example, integers may be both printed and displayed in Braille. Plus and minus signs may be raised and/or displayed in Braille. By replacing complex music notation with numerical designations, the system is more accessible to the visually impaired. Braille symbols may be created using raised inks or by embossing or any other technique suitable for creating a tactile symbol, readily sensible by touch, on a sheet.

Raised ink may be formed by printing using an engraved plate causing the printed material to raise slightly off the sheet or by using thermography. In the latter case, the design is printed on the sheet and the sheet is then passed under a powder funnel that sprinkles a thermography powder on the sheet. The sheet is then passed under a heated oven that fuses the powdered particles to the wet printing ink, and a high-powered vacuum is used to remove the excess powder. The fused mixture creates a "raised" appearance when the mixture hardens, without damaging the sheet.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A music training kit comprising a numerical keyboard chart and a numerically notated sheet,
   said numerical keyboard chart comprising a sheet having a face and magnetic backing, a sheet width and a sheet height,
   the face of the keyboard chart displaying a plurality of rectangles corresponding to a plurality of keys on a keyboard, said keys on the keyboard including naturals and accidentals,
   the sheet width being no greater than a width of the keyboard,
   each rectangle having a rectangle width about equal to a width of a key of the keyboard, and
   each rectangle being separated from an adjacent rectangle by a space, and
   the plurality of rectangles being configured to align with the keys of the keyboard,
   and the sheet height being between 1 inch and 6 inches; and
   said numerically notated sheet, and
   the rectangles corresponding to naturals have a first appearance, and the rectangles corresponding to accidentals having a second appearance, and
   each rectangle corresponding to a natural displaying a number, said number being an integer having an absolute value from 1 to 7, and
   at least one magnetically attachable indicia, said attachable indicia being removably attachable to the face of the numerical keyboard chart; and
   a corresponding numerically notated sheet comprising a sheet having a plurality of rows, each row displaying a plurality of numbers, each of said numbers being an integer having an absolute value from 1 to 7 and corresponding to numbered rectangle of the numerical keyboard chart.

2. A music training kit according to claim 1, said magnetically attachable indicia comprising a tile with a face and a backing, the face of the tile being black and the backing being magnetic, said attachable indicia being sized and shaped to cover a rectangle of said numerical keyboard chart.

3. A music training kit according to claim 1, said magnetically attachable indicia comprising a tile with a face and a backing, the face of the tile being black and the backing being magnetic, said attachable indicia being sized and shaped to cover a plurality of rectangles of said numerical keyboard chart.

4. A music training kit according to claim 1, said rectangles corresponding to a natural including a plurality of rectangles corresponding to a middle octave, a plurality of rectangles corresponding to a lower octave and a plurality of octaves corresponding to a higher octave, the rectangles corresponding to the lower octave displaying a negative sign adjacent to the number displayed on the rectangles, and the rectangles corresponding to the higher octaves displaying a positive sign adjacent to the number displayed on the rectangles, and the rectangles corresponding to the middle octaves not displaying a sign adjacent to the number displayed on the rectangles.

5. A music training kit according to claim 4, said integers, positive signs and negative signs being raised and sensible by touch.

6. A music training kit according to claim 4, further comprising a Braille equivalent for each integer, said Braille equivalent being sensible by touch.

7. A music training kit according to claim 2, said rectangles corresponding to a natural including a plurality of rectangles corresponding to a middle octave, a plurality of rectangles corresponding to a lower octave and a plurality of octaves corresponding to a higher octave, the rectangles corresponding to the lower octave displaying a negative sign adjacent to the number displayed on the rectangles, and the rectangles corresponding to the higher octaves displaying a positive sign adjacent to the number displayed on the rectangles, and the rectangles corresponding to the middle octaves not displaying a sign adjacent to the number displayed on the rectangles.

8. A music training kit according to claim 1, said magnetically attachable indicia comprising a tile with a face and a backing, the face of the tile being shaped as an indicia from the group consisting of an integer number from 1 to 7, a plus sign, a minus sign, and a rectangle concealing tile.

9. A music training kit according to claim 2, said magnetically attachable indicia comprising a tile with a face and a backing, the face of the tile being shaped as an indicia from the group consisting of an integer number from 1 to 7, a plus sign, a minus sign, and a rectangle concealing tile.

10. A music training kit according to claim 1, said corresponding numerically notated sheet further comprising a duration symbol beneath each number displayed on each row.

11. A music training kit according to claim 8, each duration symbol comprising a horizontal line having a length corresponding to the duration of a key.

12. A music training kit according to claim 9, each horizontal line including at least one tick, each tick indicating a unit of duration of a key.

13. A music training kit according to claim 10, each horizontal line, tick and number on the corresponding numerically notated sheet being raised and sensible by touch.

14. A music training kit according to claim 13, further comprising a Braille equivalent for each number on the corresponding numerically notated sheet, said Braille equivalent being sensible by touch.

15. A music training method comprising steps of
providing a numerically notated sheet comprising a sheet having a plurality of rows, each row displaying a plurality of numbers, each of said numbers being an integer having an absolute value from 1 to 7 and corresponding to a key of a keyboard, and said integers corresponding to keys to be played for a musical composition; and
providing a numerical keyboard chart,
said numerical keyboard chart comprising a sheet having a face and magnetic backing, a sheet width and a sheet height,
the face of the keyboard chart displaying a plurality of rectangles corresponding to a plurality of keys on a keyboard, said keys on the keyboard including naturals and accidentals,
the sheet width being no greater than a width of the keyboard,
each rectangle having a rectangle width about equal to a width of a key of the keyboard, and
each rectangle being separated from an adjacent rectangle by a space, and
the plurality of rectangles being configured to align with the keys of the keyboard,
and the sheet height being between 1 inch and 6 inches; and
said numerically notated sheet, and
the rectangles corresponding to naturals have a first appearance, and the rectangles corresponding to accidentals having a second appearance, and
each rectangle corresponding to a natural displaying a number, said number being an integer having an absolute value from 1 to 7, and
a plurality of magnetically attachable indicia, said attachable indicia being removably attachable to the face of the numerical keyboard chart; and
playing the key corresponding to each numbered rectangle on the keyboard chart as indicated by each number on the numerically notated sheet.

16. A music training method according to claim 15, further comprising placing a magnetically attachable indicia over each rectangle corresponding to a key not to be played, each magnetically attachable indicia comprising a tile with a face and a backing, the face of the tile being black and the backing being magnetic, said attachable indicia being sized and shaped to cover a rectangle of said numerical keyboard chart.

17. A music training method according to claim 15, further comprising placing a magnetically attachable indicia over each rectangle corresponding to a key not to be played, each magnetically attachable indicia comprising a tile with a face and a backing, the backing being magnetic.

18. A music training method according to claim 15, said rectangles corresponding to a natural including a plurality of rectangles corresponding to a middle octave, a plurality of rectangles corresponding to a lower octave and a plurality of octaves corresponding to a higher octave, the rectangles corresponding to the lower octave displaying a negative sign adjacent to the number displayed on the rectangles, and the rectangles corresponding to the higher octaves displaying a positive sign adjacent to the number displayed on the rectangles, and the rectangles corresponding to the middle octaves not displaying a sign adjacent to the number displayed on the rectangles.

19. A music training method according to claim 15, said magnetically attachable indicia comprising a tile with a face and a backing, the face of the tile being shaped as an indicia from the group consisting of an integer number from 1 to 7, a plus sign, a minus sign, and a rectangle concealing tile.

20. A music training kit according to claim 1, said corresponding numerically notated sheet further comprising a duration symbol beneath each number displayed on each row, and said method comprising playing a key for a duration according to the duration symbol.

* * * * *